Patented May 11, 1948

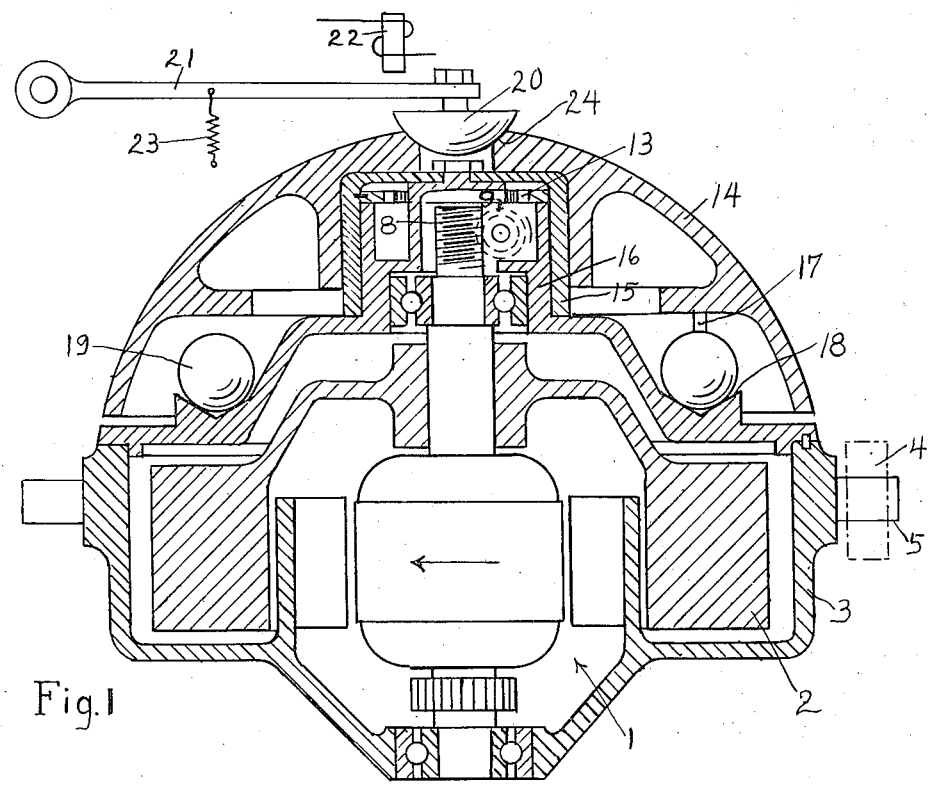
May 11, 1948.  R. ALKAN  2,441,307
GYROSCOPE ERECTING AND CAGING MECHANISM
Filed May 30, 1945
INVENTOR.
Robert Alkan
BY Maurice Landers
Atty.

2,441,307

UNITED STATES PATENT OFFICE 2,441,307

GYROSCOPE ERECTING AND CAGING MECHANISM

Robert Alkan, Locust Valley, N. Y., assignor to Specialties, Inc.

Application May 30, 1945, Serial No. 596,785

9 Claims. (Cl. 74—5)

The present invention relates to gyroscopes and has for an object to provide an improved mechanism for quickly bringing the gyroscope to normal operating position.

Vertical axis gyroscopes have automatic erector mechanisms which in operation cause the gyroscopes to assume and maintain a vertical position. When the power is shut off, they tend to stop in a position which can be substantially different than the vertical and when started from such position, they require adjustment to the vertical position before useful operation can begin. If the usual erector mechanism alone is relied upon to bring the gyroscope to vertical position, there is a considerable time delay before the gyroscope assumes operative position.

This invention has been developed more particularly for application to vertical axis gyroscopes in order to provide means for causing a gyroscope to assume a substantially upright position for caging when the power is shut off after use and before rotation ceases. The mechanism in its preferred form is also operable when the gyroscope is started to bring it to the predetermined, normal position if by any chance the gyroscope is not at that time caged in its normal position. For the purposes of disclosure of the principles of the invention, such an application of the invention will be more particularly described but it will be understood that the principles of the apparatus described can be applied to bring gyroscopes of other types to their normal operating or starting positions.

The nature and objects of the invention will be better understood from a description of a particular, illustrative embodiment for the purposes of which description reference should be had to the accompanying drawings forming a part hereof and in which Figure 1 is a central, sectional view of a gyroscope embodying the principles of the invention.

Fig. 2 is a detail view.

Fig. 3 is an electrical diagram and diagrammatic view showing certain principal parts of the mechanism.

The gyroscope shown comprises an electric motor 1 driving a rotor 2 arranged for rotation about a vertical axis and mounted in a Cardan suspension for angular movement about two mutually perpendicular, horizontal axes normally lying in a plane at right angles to the spin axis so that the gyroscope has three degrees of freedom. The gyroscope rotor is mounted in the casing 3 and the Cardan suspension comprises an inner gimbal ring 4 to which the casing is pivotally connected at 5 and the inner gimbal ring in turn is supported in an outer gimbal ring on pivots at right angles to but in the same plane as pivots 5. The central shaft of the rotor extends through the top of the casing and carries a worm 8 which meshes with the worm wheel 9 carrying the worm 10, meshing in turn with the worm wheel 11 fixed on a vertically arranged shaft carrying at its upper end a spur pinion 12 which drives an internal spur ring gear 13 and the dome-shaped head 14 connected thereto. This gearing constitutes a reduction gearing whereby the internal ring gear and head 14 are driven at a rate very much less than the high spin rate of the gyroscope rotor and numerous tests have indicated that for satisfactory gyroscope operation and erection, the rate of revolution of the internal ring gear should be substantially lower than that of the flywheel. The ring gear is secured to the head 14 by an intermediate cap or sleeve 15, which in turn is mounted to rotate on a cylindrical extension 16 of the gyroscope casing. The dome-shaped head 14 is frictionally connected to the cap 15 for normal driving engagement while permitting slipping in order to prevent stripping of the gears in the reduction gearing if rotation of the head is resisted. The head 14 carries three depending, vertical pins 17 spaced 120° apart and positioned above a track 18 on the gyroscope casing on which track three ball weights 19 rotate. In operation the ball weights are pushed around the track but allowed to roll forward to the low point of the track between the pins. The erector mechanism may be modified to include only one ball or any other suitable number of balls.

In operation of the ball erecting system, each of the three balls is constantly driven in a predetermined direction around the track by a corresponding pin in engagement therewith. The rate at which the ball is driven is relatively low compared to the rate of revolution of the gyroscope rotor and is such that the period of rest of a ball at the lowest point of its path when it runs ahead by gravity due to the tilt of the gyroscope, is brought to within the required limits. The rate of ball driving movement is of the order of several hundred times slower than that of the flywheel and may vary depending upon the total kinetic momentum of the gyroscope. In the particular gyroscope shown, the head turns 13 revolutions per minute. When the gyroscope is rotating on a true vertical axis, the three balls are simply pushed around the track and remain equally spaced. If the gyroscope tilts in response to some external disturbance, the balls tend to roll toward the low point of the track. The limit of the movement of the ball is substantially 120° and this has been found to give certain, particular advantages.

The turning ball erector so far described, when at rest, inconveniently locates the center of gravity of the gyroscope eccentric to the axis and consequently with the rotor axis at a substantial angle to the vertical, 30° for example. From this position, the regular ball erector will require a long time, for instance fifteen minutes, to erect the gyroscope to the vertical. The present invention provides a device operating on the principle that if friction is applied to the gyroscope rotor or to a member turning in the same direction to resist rotation at a point removed from the axis, it will cause a force acting in one direction on the gyroscope to cause precession in a direction at right angles to the force applied. The point of application of the friction is properly selected so that erection of the gyroscope will follow.

The ball-driving, turning head 14 of the gyroscope shown may conveniently serve the additional purpose of this device. Referring to Fig. 1, the dome-shaped head 14 preferably is spherical at its operative surface and has its center of curvature at or near the center of support of the gyroscope. A button or friction member 20 is held in elevated position free of the head by an electro-magnet 22 during operation of the gyroscope. When the power energizing the gyroscope is shut off, and before the gyroscope comes to rest, the button or friction member 20 carried by an arm 21 is released by de-energizing electro-magnet 22 and pressed by a spring 23 against the dome-shaped head in position vertically above the center of support of the gyroscope rotor. If the same principle is applied to a directional gyroscope other than a vertical axis gyroscope, the friction member is correspondingly positioned to cause the gyroscope to precess toward its normal operating or at least its normal starting position. If the rotor axis is substantially in its normal position perpendicular to the base, the button takes into the central recess 24 in the top of the head. If, however, the gyroscope is tilted at an angle, the button will press against the surface with frictional resistance creating a force in a direction to cause precession toward the perpendicular position until the button can take into the recess and hold the gyroscope caged. Thus, the gyroscope remains in normal position ready to be started for its next use.

It may happen by some accident that when the gyroscope is started, it is not caged. If this occurs, then as the current is applied, the friction member 20 will be held against the dome-shaped head because the power in the electro-magnet 22 will not be sufficient to retract the arm 21 against the force of the spring 23. Accordingly, as the gyroscope is energized, the friction member 20 will cause precession of the gyroscope until the friction member 20 takes into the recess in the head. When this occurs, the downward movement of the arm carrying the friction member will close the circuit through resistance 25 and thermal relay 26, and after a brief delay, the thermal relay will act to short circuit the resistance 27, whereupon the current in the electromagnet 22 will increase and the power will be sufficient to retract the friction member 20 out of contact with the head 16.

This movement in turn will open the circuit through the thermal relay and close the operating circuit through the lamp 30 to indicate to the pilot that the circuits are closed for normal operation.

The constants of the electro-magnet 22, resistance 27, and spring 23, are such that once the friction member 20 is retracted, the current through the electro-magnet will be sufficient to hold it retracted even after the short circuit of resistance 27 is opened by action of the thermal relay.

The foregoing description of a particular embodiment is illustrative merely and is not to be construed as defining the limits of the invention. Obviously, the principles of the invention can be variously applied and variations and modifications in the arrangement can be made without departing from the spirit of the invention as defined in the claims.

I claim:

1. A directional gyroscope comprising a rotor, an electric motor driving said rotor, a rotatable head driven to rotate in the same direction as the rotor and coaxial therewith, a friction member engaging the head to cause precession toward normal operating position, and an electrical circuit including an electro-magnet adapted to retract the friction member from engagement with the rotatable head and to hold it retracted while the motor is energized but having means for inhibiting its operation to retract the friction member when the friction member engages the head and the rotor is in other than normal operating position.

2. A directional gyroscope comprising a rotor, a rotatable head coaxial with the rotor and means for driving it in the same direction as the rotor, a friction member capable of engagement with the rotatable head to cause precession of the rotor toward normal operating position and means actuated automatically by the rotor when it reaches normal operating position for retracting said friction member from engagement with the rotatable head and holding it retracted during normal operation of the gyroscope and adapted to release the friction member for engagement with the rotatable head when the driving power for the gyroscope is shut off.

3. A gyroscope comprising a rotor having a vertical axis, a dome-shaped member coaxial with the rotor and having an axial recess, reduction gearing for driving said dome-shaped member from the rotor, and a friction member movable toward and from the dome-shaped member at a position coaxial with the gyroscope rotor when erect and adapted to enter the axial recess of the dome-shaped member when the gyroscope is erect.

4. The combination with a vertical axis gyroscope having an electric motor, an erecting mechanism comprising a horizontal track, a ball rotatable on said track, and a rotatable head having a projection engageable with the ball to move it around said circular track of a friction member engageable with the rotatable head to cause precession of the gyroscope toward vertical operating position, an electric circuit in parallel with the electric motor circuit including a time delay relay and an electro-magnet energized by operation of the time delay relay to retract the friction member from engagement with the head and to hold it retracted during normal operation, said electric circuit including means to inhibit retraction if the gyroscope is in other than vertical operating position.

5. A gyroscope comprising a rotor having a vertical axis, a dome-shaped member coaxial with the rotor, a friction member movable towards and from the dome-shaped member at a position coaxial with the gyroscope rotor when erect, and means for holding the friction member in engagement with the dome-shaped member temporarily during starting of the gyroscope and means controlled automatically by the gyroscope for retracting the friction member after the gyroscope is erect and in normal operation.

6. A gyroscope comprising a rotor having a vertical axis, a dome-shaped member coaxial with the rotor, means for driving said dome-shaped member at a lower speed than the rotor, a friction member movable toward and from the dome-shaped member at a position coaxial with the gyroscope rotor when erect, means for holding the friction member in engagement with the dome-shaped member temporarily during starting of the gyroscope and means controlled by the gyroscope for retracting the friction member after the gyroscope is erect and in normal operation.

7. A gyroscope comprising a rotor, an electric motor driving said rotor, a dome-shaped member coaxial with the rotor and having an axial recess, a friction member movable toward and from the dome-shaped member at a position coaxial with the gyroscope rotor when the rotor is in normal operating position and adapted to enter the axial recess of the dome-shaped member when the gyroscope is in normal operating position, and an electrical circuit for controlling the friction member including a resistance and means controlled by the friction member for short circuiting the resistance after the friction member enters the recess of the dome-shaped member.

8. A gyroscope comprising a rotor, an electric motor driving said rotor, a dome-shaped member coaxial with the rotor and driven thereby having an axial recess, a friction member movable toward and from the dome-shaped member and adapted to enter the coaxial recess when the rotor is in normal operating position, and an electrical circuit including an electro-magnet operative to retract the friction member from the dome, a resistance in series with the electro-magnet permitting a holding current through the electro-magnet sufficient to hold the friction member in retracted position but insufficient to retract the friction member, a thermal relay operative to short circuit the resistance temporarily to increase current in the electro-magnet whereby it will retract the friction member, and a switch adapted to close the circuit of the thermal relay when the friction member enters the recess in the dome-shaped member.

9. A gyroscope comprising a rotor, an electric motor driving said rotor, a dome-shaped member coaxial with the rotor and driven thereby having an axial recess, a friction member movable toward and from the dome-shaped member and adapted to enter the coaxial recess when the rotor is in normal operating position, and an electrical circuit including an electro-magnet arranged to retract the friction member from the dome, a resistance in series with the electro-magnet permitting a holding current through the electro-magnet sufficient to hold the friction member in retracted position but insufficient to retract it, a relay arranged to be operated by the friction member when it takes into the recess in the dome-shaped member to cause short circuiting of the resistance thereby increasing the current in the electro-magnet sufficiently to cause it to retract the friction member.

ROBERT ALKAN.

REFERENCES CITED

The following references are of record in the file of this patent:

UNITED STATES PATENTS

| Number | Name | Date |
| --- | --- | --- |
| 1,825,345 | Fieux | Sept. 29, 1931 |
| 1,955,746 | Inglis | Apr. 24, 1934 |
| 2,202,955 | Langgasser | June 4, 1940 |
| 2,328,744 | Roters | Sept. 7, 1943 |

OTHER REFERENCES

Ser. No. 365,530, Schwarz et al. (A. P. C.), published May 4, 1943.